US012620688B2

(12) United States Patent
Yu et al.

(10) Patent No.: US 12,620,688 B2
(45) Date of Patent: May 5, 2026

(54) DISPLAY SUBSTRATE AND METHOD FOR MANUFACTURING DISPLAY SUBSTRATE

(71) Applicant: BOE Technology Group Co., Ltd., Beijing (CN)

(72) Inventors: Hai Yu, Beijing (CN); Jia Fang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 475 days.

(21) Appl. No.: 17/425,404

(22) PCT Filed: Jan. 7, 2021

(86) PCT No.: PCT/CN2021/070638
§ 371 (c)(1),
(2) Date: Jul. 23, 2021

(87) PCT Pub. No.: WO2021/147683
PCT Pub. Date: Jul. 29, 2021

(65) Prior Publication Data

US 2022/0320709 A1 Oct. 6, 2022

(30) Foreign Application Priority Data

Jan. 22, 2020 (CN) ......................... 202010076023.6

(51) Int. Cl.
*H01Q 1/22* (2006.01)
*G09F 9/00* (2006.01)
(Continued)

(52) U.S. Cl.
CPC ................. *H01Q 1/22* (2013.01); *G09F 9/00* (2013.01); *H01Q 1/38* (2013.01); *H01Q 1/48* (2013.01);
(Continued)

(58) Field of Classification Search
CPC H01Q 1/22; H01Q 1/48; H01Q 21/08; H01Q 9/0407; H01Q 1/243; H01Q 21/28;
(Continued)

(56) References Cited

U.S. PATENT DOCUMENTS 8,525,941 B2 9/2013 Shi et al.
10,838,568 B2 11/2020 Cheng et al.
(Continued)

FOREIGN PATENT DOCUMENTS

CN 101930134 A 12/2010
CN 106932947 A 7/2017
(Continued)

OTHER PUBLICATIONS

Office Action dated Jan. 1, 2025, issued in counterpart CN Application No. 202010076023.6, with English translation. (16 pages).

*Primary Examiner* — Dameon E Levi
*Assistant Examiner* — Yonchan J Kim
(74) *Attorney, Agent, or Firm* — WHDA, LLP

(57) ABSTRACT

The present disclosure provides to a display substrate and a method for manufacturing the display substrate. The display substrate include: a substrate; a polarizing layer disposed on a light-emitting side of the substrate; a common electrode layer disposed on a light-incident side of the substrate; a light shielding layer disposed on a side of the common electrode layer away from the substrate; and at least one antenna array, wherein each of the at least one antenna array comprises a plurality of antenna units, and each antenna unit includes a first radiating portion disposed on the light-emitting side of the substrate and a grounding portion disposed on the light-incident side of the substrate.

13 Claims, 14 Drawing Sheets

(51) Int. Cl.

| | |
|---|---|
| ***H01Q 1/38*** | (2006.01) |
| ***H01Q 1/48*** | (2006.01) |
| ***H01Q 9/04*** | (2006.01) |
| ***H01Q 21/00*** | (2006.01) |
| ***H01Q 21/08*** | (2006.01) |

(52) U.S. Cl.
CPC ........... *H01Q 9/0407* (2013.01); *H01Q 21/00* (2013.01); *H01Q 21/08* (2013.01)

(58) Field of Classification Search
CPC . H01Q 1/36; H01Q 1/38; H01Q 21/00; G09F 9/00
See application file for complete search history.

(56) References Cited

U.S. PATENT DOCUMENTS

2012/0092577 A1 4/2012 Shi et al.
2013/0264390 A1* 10/2013 Frey .......................... C23F 1/02 235/492
2014/0106684 A1* 4/2014 Burns .................... H01Q 21/28 29/601
2017/0104260 A1 4/2017 Yoon et al.
2020/0020272 A1* 1/2020 Huang ................... H10K 59/35
2020/0021008 A1* 1/2020 Yong .................... H01Q 21/005
2020/0021016 A1* 1/2020 Son ...................... H01Q 21/065
2020/0209995 A1* 7/2020 So ........................ H01Q 21/065
2020/0241671 A1 7/2020 Cheng et al.
2021/0026178 A1 1/2021 Wang et al.
2021/0263606 A1* 8/2021 Lee ....................... G06F 3/0412

FOREIGN PATENT DOCUMENTS

CN 108511902 A 9/2018
CN 108733196 A 11/2018
CN 108780256 A 11/2018
CN 210956975 U 7/2020
KN 20160061504 A * 6/2016
WO 2015/188323 A1 12/2015
WO 2018/137339 A1 8/2018

* cited by examiner

DISPLAY SUBSTRATE AND METHOD FOR MANUFACTURING DISPLAY SUBSTRATE

CROSS-REFERENCE TO RELATED APPLICATION

This application is a Section 371 National Stage Application of International Application No. PCT/CN2021/070638, filed on Jan. 7, 2021, entitled "DISPLAY SUBSTRATE AND METHOD FOR MANUFACTURING DISPLAY SUBSTRATE", which claims priority to Chinese Application No. 202010076023.6, filed on Jan. 22, 2020, which are incorporated herein by reference in their entirety.

TECHNICAL FIELD

The present disclosure relates to the field of display technology, and in particular to a display substrate and a method for manufacturing the display substrate.

BACKGROUND

In conventional technology, antennas of an electronic device are usually disposed in areas not occupied by a display. With advancement of technology, the display occupies more and more space on the electronic device such as mobile phones, TVs, tablets, notebook computers, desktop computers and the like, such that the space available for deployment of antennas on electronic device becomes smaller.

SUMMARY

According to one aspect of the present disclosure, a display substrate is provided, including:

- a substrate;
- a polarizing layer disposed on a light-emitting side of the substrate;
- a common electrode layer disposed on a light-incident side of the substrate;
- a light shielding layer disposed on a side of the common electrode layer away from the substrate; and
- at least one antenna array, wherein each of the at least one antenna array comprises a plurality of antenna units, and each antenna unit comprises a first radiating portion disposed on the light-emitting side of the substrate and a grounding portion disposed on the light-incident side of the substrate.

For example, the antenna unit further comprises a second radiating portion disposed on a side of the first radiating portion away from the substrate.

For example, the first radiating portion is disposed on the polarizing layer at a side of the polarizing layer facing the substrate, and the second radiating portion is disposed on the polarizing layer at a side of the polarizing layer away from the substrate.

For example, the first radiating portion and the second radiating portion are disposed on the same side of the polarizing layer, and the display substrate further comprises a first insulating layer disposed between the first radiating portion and the second radiating portion.

For example, a projection range of the second radiating portion on the substrate falls within a projection range of the first radiating portion on the substrate.

For example, the grounding portion is disposed on a side of the light shielding layer away from the common electrode layer.

For example, the light shielding layer comprises a black matrix; and a projection of the grounding portion on the substrate falls within a projection of the black matrix on the substrate.

For example, the grounding portion is disposed between the substrate and the common electrode layer.

For example, the display substrate further includes a second insulating layer disposed between the grounding portion and the common electrode layer.

For example, the first radiating portion is disposed on a side of the polarizing layer facing the substrate or a side of the polarizing layer away from the substrate.

For example, each of the first radiating portion and the grounding portion is implemented as a metal grid, a width of grid lines of the metal grid is less than or equal to 5 μm, a distance between adjacent grid lines is greater than or equal to 200 μm.

For example, the metal grid is made of at least one of copper, gold or silver.

For example, the projection range of the first radiating portion on the substrate falls within a projection range of the grounding portion on the substrate; and the first radiating portion comprises a first portion for radiating energy and a second portion for feeding power to the first portion, and the second portion extends from the first portion to an edge of the display substrate.

For example, the at least one antenna array comprises at least one of a first antenna array, a second antenna array, a third antenna array or a fourth antenna array, a plurality of antenna units of the first antenna array are arranged along a first edge of the display substrate, a plurality of antenna units of the second antenna array are arranged along a second edge of the display substrate opposite to the first edge, a plurality of antenna units of the third antenna array are arranged along a third edge of the display substrate, and a plurality of antenna units of the fourth antenna array are arranged along a fourth edge of the display substrate opposite to the third edge.

For example, each of the first antenna array, the second antenna array, the third antenna array and the fourth antenna array comprises 4 or more antenna units.

According to another aspect of the present disclosure, a method for manufacturing the above-mentioned display substrate, including:

- forming a common electrode layer, a light shielding layer and a grounding portion of each of a plurality of antenna units of at least one antenna array on a light-incident side of a substrate; and
- forming a polarizing layer and a first radiating portion of each of the plurality of antenna units of the at least one antenna array on a light-emitting side of the substrate.

For example, the method further includes: forming a second radiating portion on a side of the first radiating portion away from the substrate, so that the projection range of the second radiating portion on the substrate falls within the projection range of the first radiating portion on the substrate.

For example, the forming a common electrode layer, a light shielding layer and a grounding portion of each of a plurality of antenna units of at least one antenna array on a light-incident side of a substrate includes:

- forming the common electrode layer on a surface of the substrate at the light-incident side of the substrate;
- forming the light-shielding layer on the common electrode layer, wherein the light-shielding layer comprises a black matrix;

forming the grounding portion of each of the plurality of antenna units of the at least one antenna array on the black matrix, so that the projection of the grounding portion on the substrate falls within the projection of the black matrix on the substrate.

For example, the forming a common electrode layer, a light shielding layer and a grounding portion of each of a plurality of antenna units of at least one antenna array on a light-incident side of a substrate includes:

forming the grounding portion of each of the plurality of antenna units of the at least one antenna array on a surface of the substrate at the light-incident side of the substrate;

forming a second insulating layer on grounding portions of the plurality of antenna units of the at least one antenna array;

forming the common electrode layer on the second insulating layer; and forming the light shielding layer on the common electrode layer.

For example, the first radiating portion and the grounding portion are formed by at least one of magnetron sputtering, thermal evaporation or electroplating.

DETAILED DESCRIPTION OF EMBODIMENTS

Figure 1:
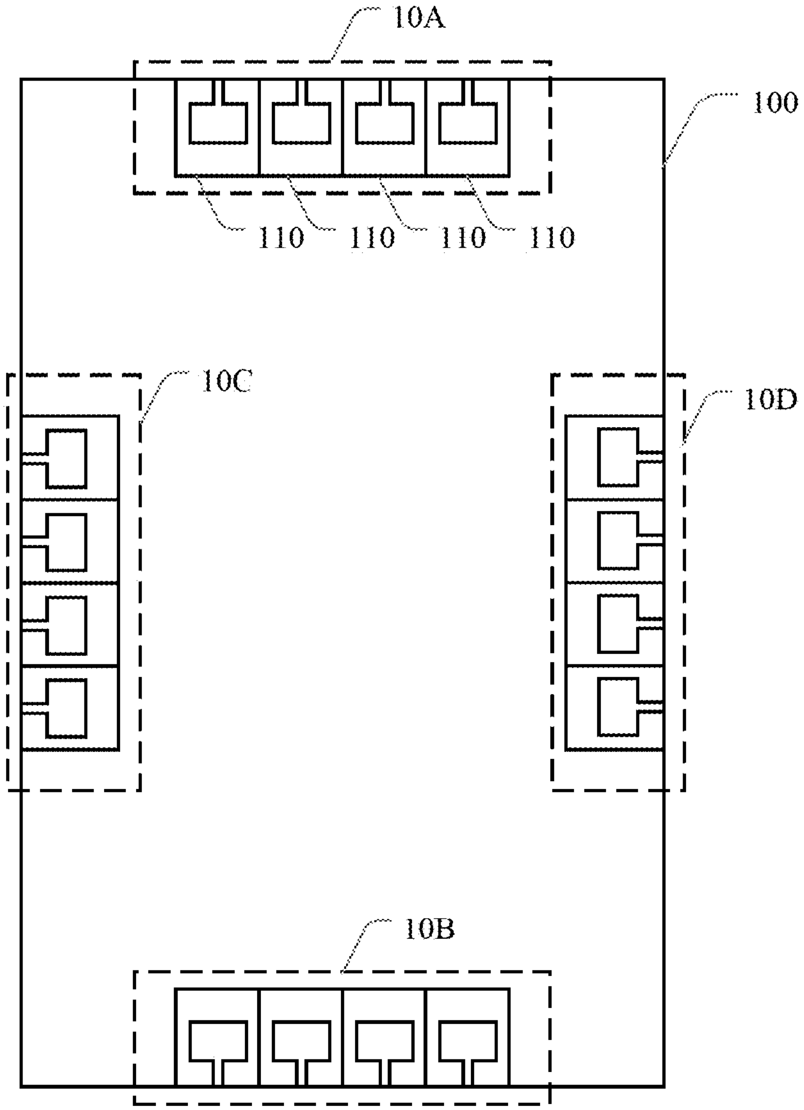
FIG. 1 illustrates a schematic view of a display substrate according to an embodiment of the present disclosure.

In order to make the objectives, technical solutions, and advantages of the embodiments of the present disclosure clearer, the technical solutions of the embodiments of the present disclosure will be described clearly and completely in conjunction with the drawings in the embodiments of the present disclosure. Obviously, the described embodiments are a part of the embodiments of the present disclosure, but not all of the embodiments of the present disclosure. Based on the described embodiments of the present disclosure, all other embodiments obtained by those skilled in the art without creative work are within the protection scope of the present disclosure. It should be noted that throughout the drawings, the same elements are indicated by the same or similar reference numerals. In the following description, some specific embodiments are only used for descriptive purposes and should not be construed as having any limitation on the present disclosure, but are merely examples of the embodiments of the present disclosure. When it may cause confusion in the understanding of the present disclosure, conventional structures or configurations will be omitted. It should be noted that the shape and size of each component in the drawings do not reflect actual sizes and ratios, but merely illustrate the content of the embodiments of the present disclosure.

Unless otherwise defined, the technical or scientific terms used in the embodiments of the present disclosure should have the usual meanings understood by those skilled in the art. The “first”, “second” and similar words used in the embodiments of the present disclosure do not indicate any order, quantity, or importance, but are only used to distinguish different components.

The embodiments of the present disclosure provide a display substrate having at least one antenna array disposed therein, wherein a radiating portion and a grounding portion of an antenna unit of the antenna array are respectively disposed on both sides of a substrate of the display substrate.

By disposing the antenna array in the display substrate, a space available for disposing the antenna array is expanded.

FIG. 1 illustrates a schematic view of a display substrate according to an embodiment of the present disclosure.

As shown in FIG. 1, the display substrate 100 includes at least one antenna array. In FIG. 1, four antenna arrays (a first antenna array 10A, a second antenna array 10B, a third antenna array 10C and a fourth antenna array 10D, collectively referred to as antenna array 10 hereinafter) are taken as an example for illustration. However, the embodiments of the present disclosure are not limited thereto, and the number of the antenna arrays 10 and positions of the antenna arrays 10 may be set as required. For example, the display substrate may include any one or more of the antenna arrays 10A, 10B, 10C, and 10D. It is also possible for the display substrate to include five or more antenna arrays.

Each antenna array 10 includes a plurality of antenna units 110, so that the antenna array 10 may act as a Multi-input Multi-output antenna array. In FIG. 1, only the antenna units 110 of the antenna array 10A are marked for brevity. As shown in FIG. 1, a plurality of antenna units 110 of the first antenna array 10A are arranged along a first edge (upper edge shown in FIG. 1) of the display substrate 100, a plurality of antenna units 110 of the second antenna array 10B are arranged along a second edge (lower edge shown in FIG. 1) of the display substrate 100 opposite to the first edge, a plurality of antenna units 110 of the third antenna array 10C are arranged along a third edge (left edge as shown in FIG. 1) of the display substrate 100, and a plurality of antenna units in the fourth antenna array 10D are arranged along a fourth edge (right edge shown in FIG. 1) of the display substrate 100 opposite to the third edge. In FIG. 1, each antenna array 10 includes four antenna units 110. However, the embodiments of the present disclosure are not limited thereto, and the number of the antenna units 110 and the arrangement of the antenna units 110 may be set as required. For example, the number of antenna units 110 may be 2n, where n is an integer greater than 1, the antenna units 110 may be arranged in other ways as required (for example, arranged in a curve or in a two-dimensional array), and the antenna units 110 may also be disposed in other positions on the display substrate as required.

Figure 2:
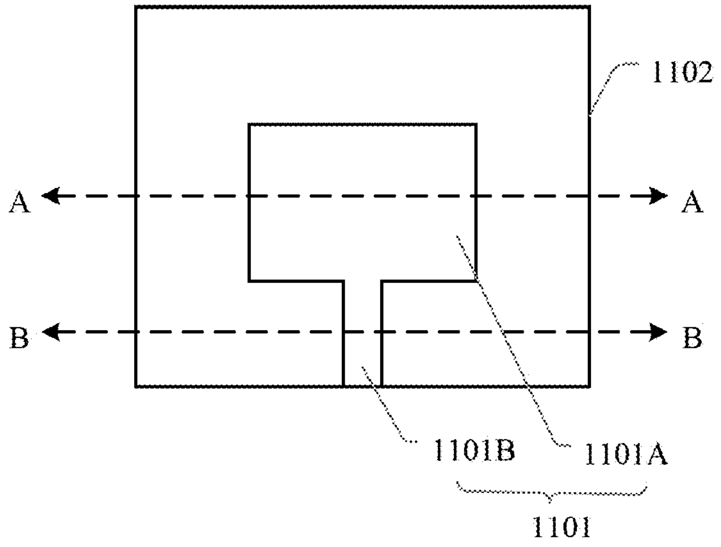
FIG. 2 illustrates a top view of an antenna unit of a display substrate according to an embodiment of the present disclosure.

FIG. 2 illustrates a top view of an antenna unit of a display substrate according to an embodiment of the present disclosure.

As shown in FIG. 2, an antenna unit 110 includes a first radiating portion 1101 and a grounding portion 1102. The first radiating portion 1101 includes a first portion 1101A for radiating energy and a second portion 1101B for feeding power to the first portion 1101A. The second portion 1101B extends from the first portion 1101A to an edge of the display substrate. For example, each antenna unit 110 may be disposed in the manner shown in FIG. 1, so that the second portion 1101B of the first radiating portion 1101 of each antenna unit extends to the edge of the display substrate 100.

In the examples of FIGS. 1 and 2, the first portion 1101A of the first radiating portion 1101 has an axisymmetric shape (rectangular in FIG. 2), the second portion 1101B of the first radiating portion 1101 is strip-shaped, and the second portion 1101B extends from the first portion 1101A to the edge of the display substrate along an axis of symmetry of the first portion 1101A. In a direction perpendicular to the extending direction of the second portion 1101B, a width of the second portion 1101B is smaller than a width of the first portion 1101A. In addition, in the examples of FIGS. 1 and 2, the grounding portion 1102 is a rectangle with an area larger than the first radiating portion 1101. However, the embodiments of the present disclosure are not limited to thereto, shape and size of the first radiating portion 1101 and shape and size of the grounding portion 1102 may be set as required, which will be described in further detail below.

Figure 3A:
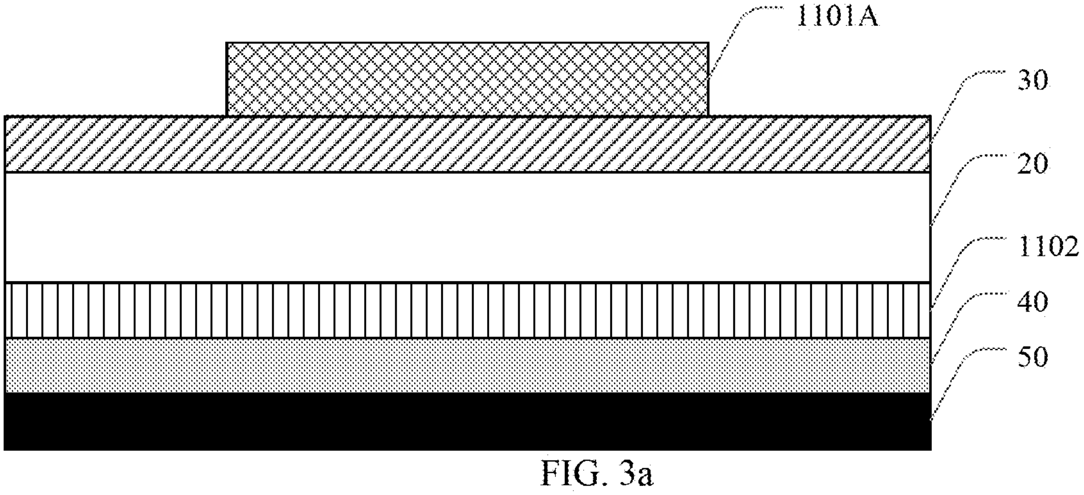
FIG. 3*a* illustrates a cross-sectional view of the display substrate along line AA in FIG. 2 according to an embodiment of the present disclosure.
Figure 3B:
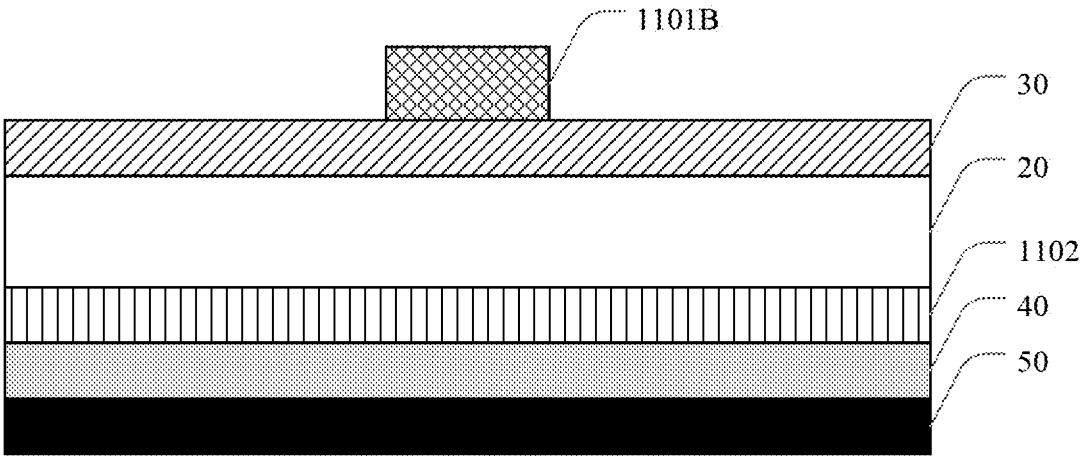
FIG. 3*b* illustrates a cross-sectional view of the display substrate along line BB in FIG. 2 according to an embodiment of the present disclosure.

FIG. 3*a* illustrates a cross-sectional view of the display substrate along line AA in FIG. 2 according to an embodiment of the present disclosure. FIG. 3*b* illustrates a cross-sectional view of the display substrate along line BB in FIG. 2 according to an embodiment of the present disclosure.

As shown in FIGS. 3*a* and 3*b*, in addition to the antenna unit 110, the display substrate 100 includes a substrate 20, a polarizing layer 30, a common electrode layer 40 and a light shielding layer 50. The polarizing layer 30 is disposed on a light-emitting side of the substrate 20, the common electrode layer 40 is disposed on a light-incident side of the substrate 20, and the light shielding layer 50 is disposed on a side of the common electrode layer 40 away from the substrate 20. The substrate 20 may be made of a light-transmitting material such as glass, and the substrate 20 is configured to transmit light on the light-incident side to the light-emitting side. The polarizing layer 30 may be a polarizing plate for polarizing light emitted from the substrate 20. The common electrode layer 40 may include a common electrode that is configured to cooperate with electrodes on the array substrate to achieve displaying. The light shielding layer 50 may include a black matrix.

As shown in FIGS. 3*a* and 3*b*, a first radiating portion 1101 of the antenna unit 110 may be disposed on the light-emitting side of the substrate 20, a grounding portion 1102 of the antenna unit 110 may be disposed on the light-incident side of the substrate 20, and a projection range of the first radiating portion 1101 on the substrate 20 may fall within a projection range of the grounding portion 1102 on the substrate 20. The first radiating portion 1101 and the grounding portion 1102 may be made of a low-resistance and low-loss metal such as copper, gold, and silver, for example, the grounding portion 1102 may be manufactured in a form of a metal grid.

Figure 3C:
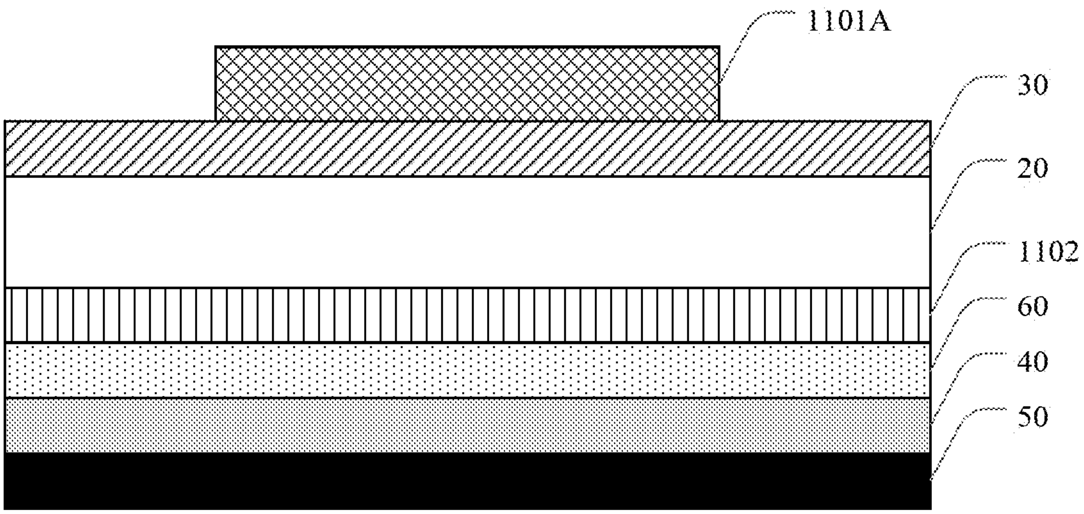
FIG. 3*c* illustrates a cross-sectional view of the display substrate along the line AA in FIG. 2 according to another embodiment of the present disclosure.
Figure 3D:
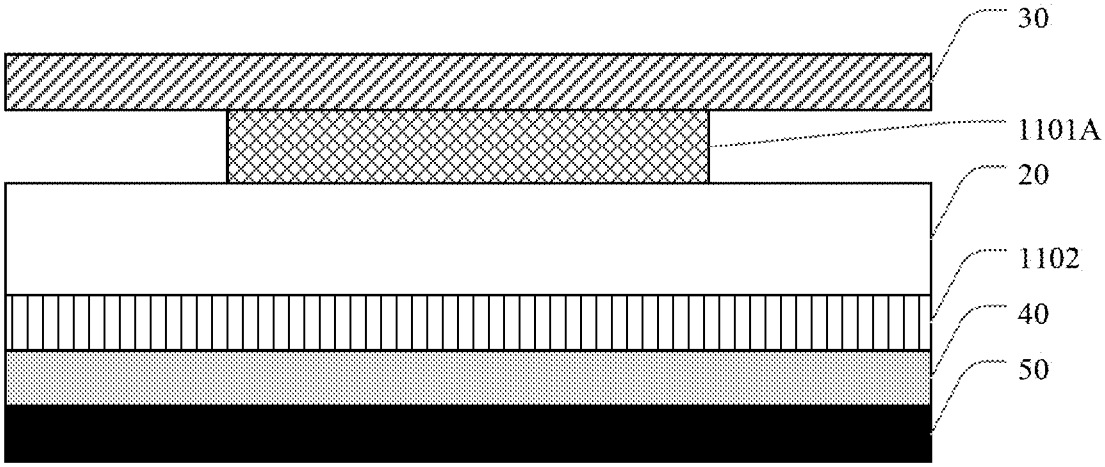
FIG. 3*d* illustrates a cross-sectional view of the display substrate along the line AA in FIG. 2 according to yet another embodiment of the present disclosure.
Figure 3E:
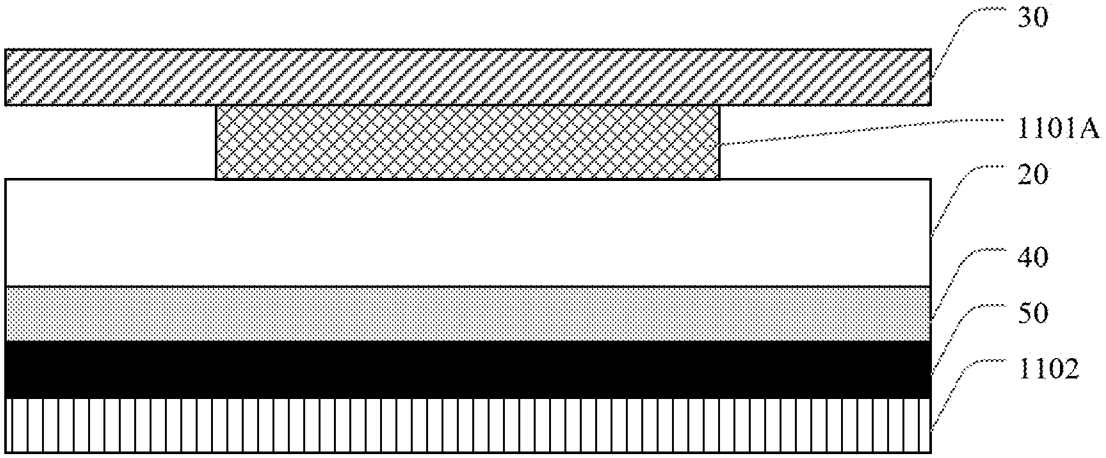
FIG. 3*e* illustrates a cross-sectional view of the display substrate along the line AA in FIG. 2 according to still another embodiment of the present disclosure.

In the examples of FIGS. 3*a* and 3*b*, the first radiating portion 1101 is disposed on the polarizing layer 30 at a side of the polarizing layer 30 away from the substrate 20, the grounding portion 1102 is disposed between the substrate 20 and the common electrode layer 40. However, the embodiments of the present disclosure are not limited thereto, and the antenna unit 110 may be disposed in the display substrate in other ways as required. For example, an insulating layer 60 (second insulating layer) may be disposed between the grounding portion 1102 and the common electrode layer 40, as shown in FIG. 3*c*. The insulating layer 60 may be made of silicon nitride (SiN) or (silicon oxide SiO). The insulating layer 60 may be formed by a Plasma Enhanced Chemical Vapor Deposition (PEVCD) process. In some embodiments, a first radiating portion 1101 may be disposed on the polarizing layer 30 at a side of the polarizing layer 30 close to the substrate 20, as shown in FIG. 3*d*. In some embodiments, the grounding portion 1102 may be disposed on a side of the light shielding layer 50 away from the common electrode layer 40, as shown in FIG. 3*e*. In the examples of FIGS. 3*c* to 3*e*, the first portion 1101A of the first radiating portion 1101 and the second portion 1101B of the first radiating portion 1101 are located on the same layer. Although only the cross-sectional view along the AA line is shown for brevity, a position of the second portion 1101B in the cross-sectional view may be illustrated by the first portion 1101A.

Figure 4:
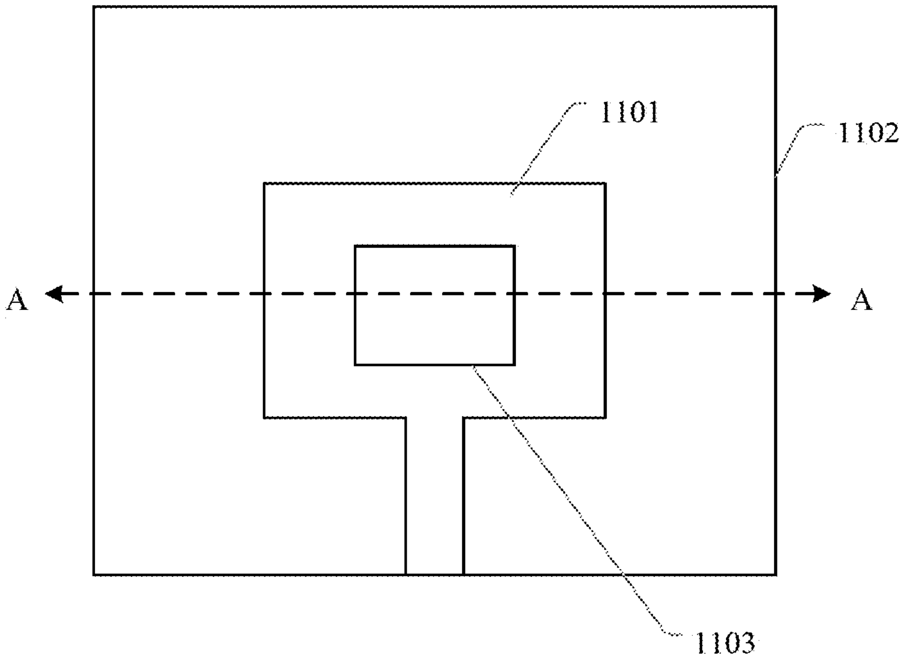
FIG. 4 illustrates a top view of an antenna unit in a display substrate according to another embodiment of the present disclosure.

FIG. 4 illustrates a top view of an antenna unit of a display substrate according to another embodiment of the present disclosure. The display substrate of FIG. 4 is similar to the display substrate of FIG. 2, and a difference is at least that the display substrate of FIG. 4 further includes a second radiating portion 1103. For brevity, the following will mainly describe the different part in detail.

As shown in FIG. 4, an antenna unit includes a first radiating portion 1101, a second radiating portion 1103 and a grounding portion 1102. The above description of the first radiating portion 1101 and the grounding portion 1102 with reference to FIGS. 1 to 3 is also applicable to FIG. 4. In FIG. 4, the area of the second radiating portion 1103 may be set to be smaller than that of the first radiating portion 1101 (for example, smaller than an area of a first portion of the first radiating portion 1101), so as to radiate energy at a higher frequency than the first radiating portion 1101 while ensuring that the first radiating portion 1101 may not be completely shielded by the second radiating portion 1103 so as to radiate energy at a lower frequency. Although the second radiating portion 1103 is shown as a rectangular shape in FIG. 4, the embodiments of the present disclosure are not limited thereto, and the shape of the second radiating portion 1103, the size of the second radiating portion 1103, and the position of the second radiating portion 1103 relative to the first radiating portion 1101 may be set as required.

Figure 5A:
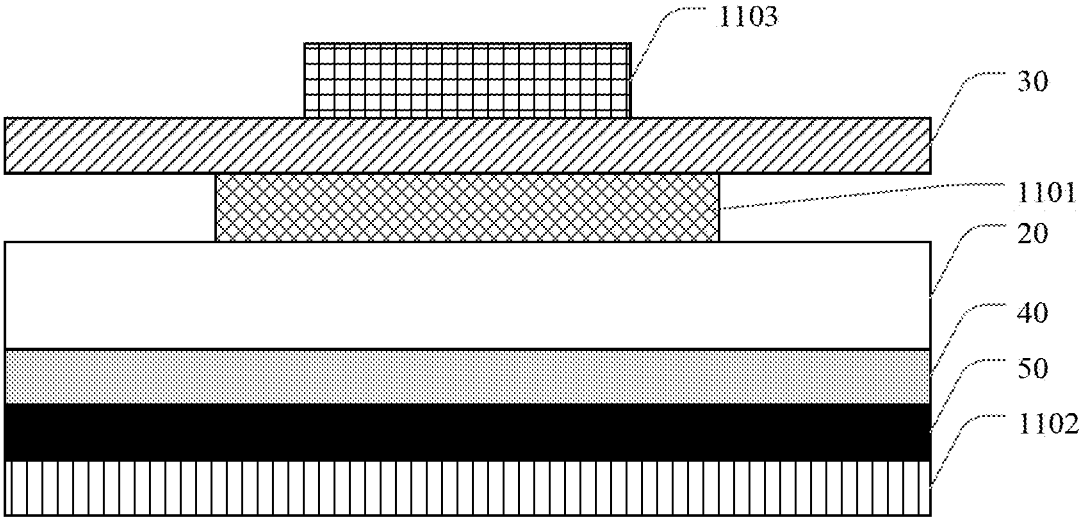
FIG. 5*a* illustrates a cross-sectional view of the display substrate along line AA in FIG. 4 according to an embodiment of the present disclosure.

FIG. 5*a* illustrates a cross-sectional view of the display substrate along line AA in FIG. 4 according to an embodiment of the present disclosure. The display substrate of FIG. 5*a* is similar to the display substrate of FIG. 3*e*, and a difference is at least that the display substrate of FIG. 5*a* further includes a second radiating portion 1103 disposed on a side of a first radiating portion 1101 away from a substrate 20. For brevity, the following will mainly describe the different part in detail.

In FIG. 5*a*, both the first radiating portion 1101 and the second radiating portion 1103 are disposed on a polarizing layer 30, wherein the first radiating portion 1101 is disposed on the polarizing layer at a side of the polarizing layer 30 facing the substrate 20, and the second radiating portion 1103 is disposed on the polarizing layer at a side of the polarizing layer 30 away from the substrate 20. A projection range of the second radiating portion 1103 on the substrate 20 falls within a projection range of the first radiating portion 1101 on the substrate 20. Different from the first radiating portion 1101, the second radiating portion 1103 may not include a feeder (as shown in FIG. 4), and energy may be transferred from the first radiating portion 1101 to the second radiating portion 1103 through a coupling of the first radiating portion 1101 and the second radiating portion 1103. The first radiating portion 1101, the second radiating portion 1103 and the grounding portion 1102 may all be made of a low-resistance and low-loss metal such as copper, gold, silver, etc., for example, manufactured in a form of a metal grid. By disposing the first radiating portion 1101 and the second radiating portion 1103, antenna array may radiate energy in two different frequency bands. For example, the first radiating portion 1101 may be configured to achieve energy radiating in a first frequency band (for example, with a center frequency of about 28 GHz), and the second radiating portion 1103 may be configured to achieve energy radiating in a second frequency band (for example, with a center frequency of about 39 GHz). In this way, a deployment of millimeter wave antenna arrays conforming to the fifth-generation mobile communication (5G, 5th-Generation) standard is implemented in the display substrate.

Figure 5B:
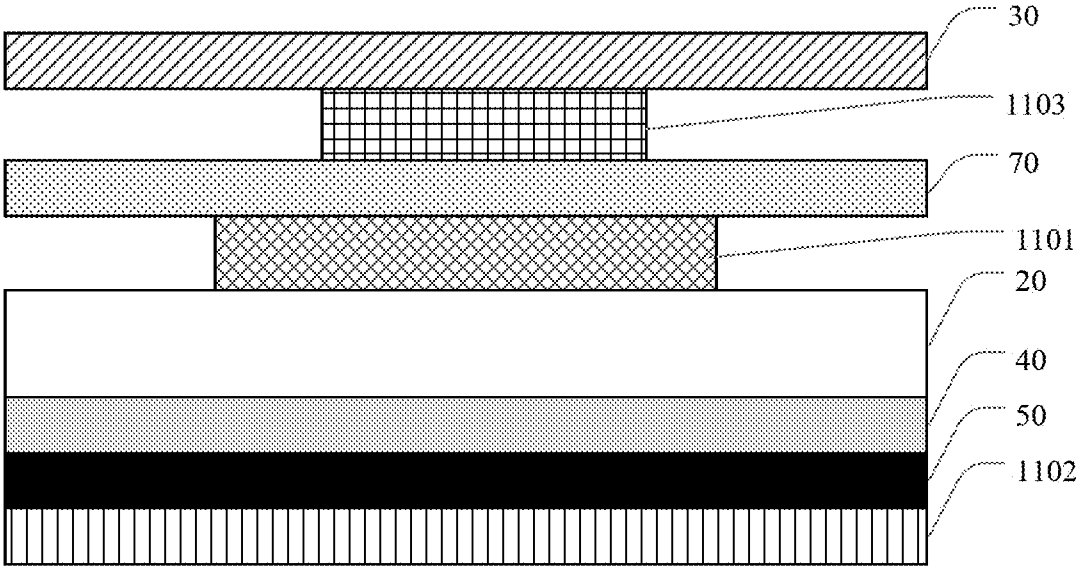
FIG. 5*b* illustrates a cross-sectional view of the display substrate along the line AA in FIG. 4 according to another embodiment of the present disclosure.

FIG. 5*b* illustrates a cross-sectional view of the display substrate along the line AA in FIG. 4 according to another embodiment of the present disclosure. The display substrate of FIG. 5*b* is similar to the display substrate of FIG. 5*a*, and a difference is at least that a first radiating portion 1101 of the display substrate and a second radiating portion 1103 of the display substrate of FIG. 5*b* are disposed on the same side of a polarizing layer 30. An insulating layer 70 (first insulating layer) is further disposed between the first radiating portion 1101 and the second radiating portion 1103. For brevity, the following will mainly describe the different part in detail.

In FIG. 5*b*, both the first radiating portion 1101 and the second radiating portion 1103 are disposed on a side of the polarizing layer 30 facing a substrate 20, and the insulating layer 70 is disposed between the first radiating portion 1101 and the second radiating portion 1103 to achieve an electrically isolation between the first radiating portion 1101 and the second radiating portion 1103. In some embodiments, the first radiating portion 1101 and the second radiating portion 1103 with the insulating layer 70 between each other may be disposed on a side of the polarizing layer 30 away from the substrate 20. The insulating layer 70 may be an insulating film made of a transparent insulating material such as PET (Polyethylene Terephthalate) or transparent polyimide.

Although in FIGS. 5*a* and 5*b* the structure at the light incident side of the substrate 20 is arranged in the manner similar to that of FIG. 3*a*, the embodiments of the present disclosure are not limited thereto. The structure on the light-incident side of the substrate 20 may be arranged according to any of the above-mentioned embodiments.

Figure 6A:
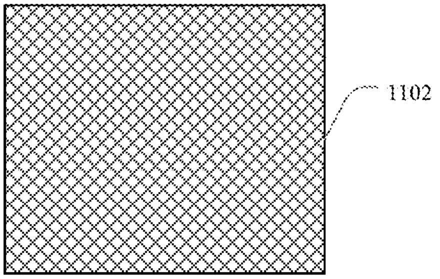
FIG. 6*a* illustrates a schematic structural view of a grounding portion of the antenna unit of FIG. 4.
Figure 6B:
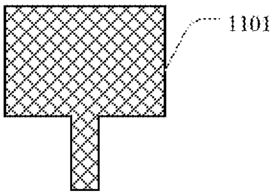
FIG. 6*b* illustrates a schematic structural view of a first radiating portion of the antenna unit of FIG. 4.
Figure 6C:
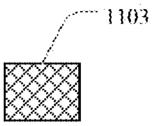
FIG. 6*c* illustrates a schematic structural view of a second radiating portion of the antenna unit of FIG. 4.

FIGS. 6*a* to 6*c* respectively illustrate schematic structural diagrams of the grounding portion, the first radiating portion and the second radiating portion of the antenna unit of FIG. 4. The structure of the antenna unit as shown in FIGS. 6*a* to 6*c* is applicable to the display substrate of any of the above-mentioned embodiments.

As shown in FIGS. 6*a* to 6*c*, one or more of the first radiating portion 1101, the second radiating portion 1103 and the grounding portion 1102 may be a metal grid. Grid lines of the metal grid may have a width less than or equal to 5 μm, and a distance between adjacent grid lines may be greater than or equal to 200 μm to ensure that a transmittance of the display substrate is within a desired range. The distance between adjacent grid lines may be less than 500 μm (that is, one twentieth of an antenna radiating wavelength) to ensure that the antenna performance is within a desired range. The metal grid may be made of at least one of copper, gold or silver. The metal grid is formed by at least one of magnetron sputtering, thermal evaporation or electroplating. In FIGS. 6*a* to 6*c*, the grid lines of the metal grid are inclined at a predetermined angle (for example, about 45 degrees) with respect to an edge of the metal grid. However, the embodiments of the present disclosure are not limited to thereto, and the metal grid may have other shapes and layouts as required.

Figure 7A:
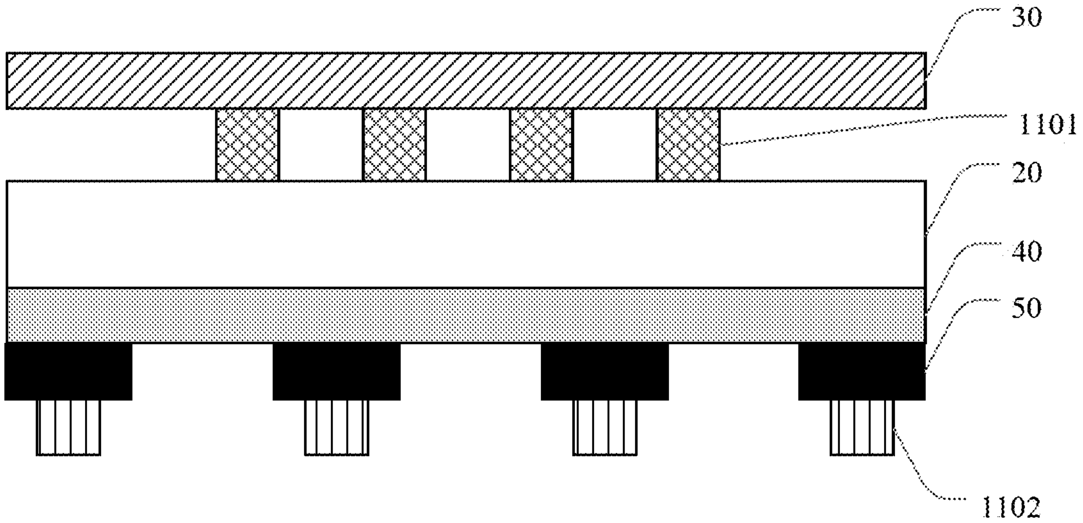
FIG. 7*a* illustrates a cross-sectional view of an antenna unit in a display substrate according to another embodiment of the present disclosure.
Figure 7B:
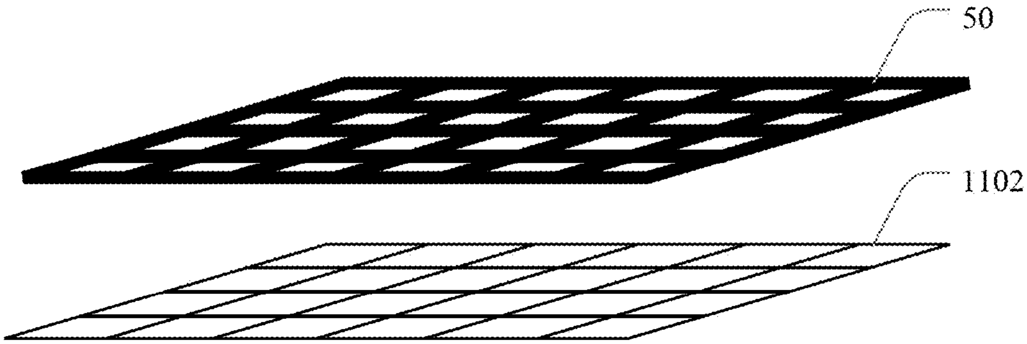
FIG. 7*b* illustrates a schematic structural view of a grounding portion and a black matrix of the antenna unit of FIG. 7*a*.

FIG. 7*a* illustrates a cross-sectional view of an antenna unit in a display substrate according to another embodiment of the present disclosure. FIG. 7*b* illustrates a schematic structural diagram of a grounding portion and a black matrix of the antenna unit of FIG. 7*a*. The display substrate of FIG. 7*a* is similar to the display substrate of FIG. 3*e*, and a difference is at least that a first radiating portion 1101 and a grounding portion 1102 have a metal grid structure as shown in FIG. 6*a* and FIG. 6*c*. For brevity, the following will mainly describe the different part in detail.

In FIGS. 7*a* and 7*b*, the light shielding layer 50 is a black matrix, and each of the first radiating portion 1101 and the grounding portion 1102 is implemented as a metal grid. The grounding portion 1102 is disposed on a side of the light shielding layer 50 away from the common electrode layer 40, and a projection of the grounding portion 1102 on the substrate 20 falls within a projection of the black matrix 50 on the substrate 20. As shown in FIG. 7*b*, the metal grid of the grounding portion 1102 may be laid out in the same manner as the black matrix. A width of grid lines of the metal grid of the grounding portion 1102 is smaller than a width of matrix units of the black matrix, so that the grounding portion 1102 is blocked by the black matrix. In this way, an influence of the antenna unit on the display may be further reduced.

Figure 8A:
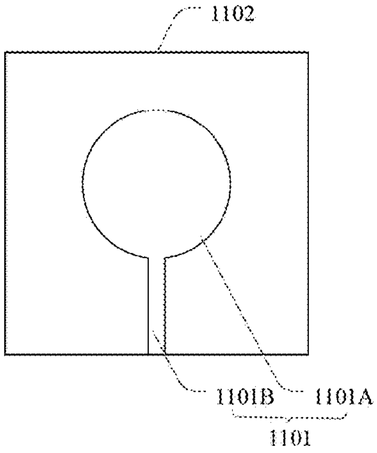
FIG. 8*a* to 8*e* respectively illustrate plan views of examples of the antenna unit according to embodiments of the present disclosure.
Figure 8B:
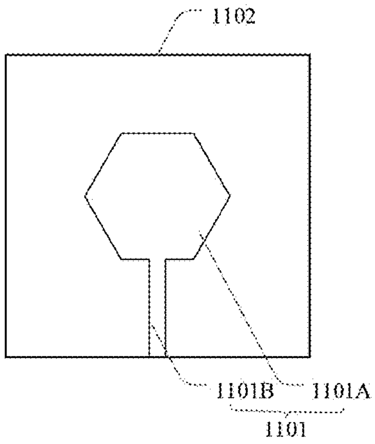
Figure 8C:
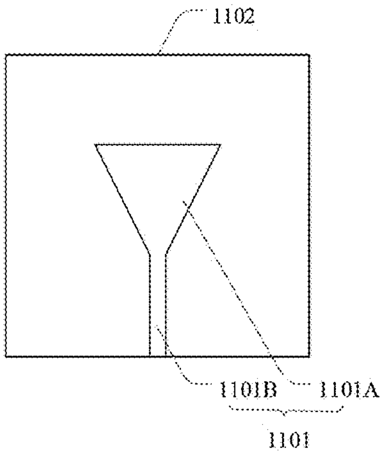
Figure 8D:
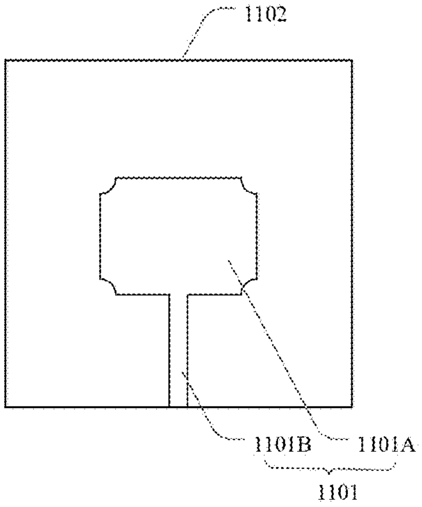
Figure 8E:
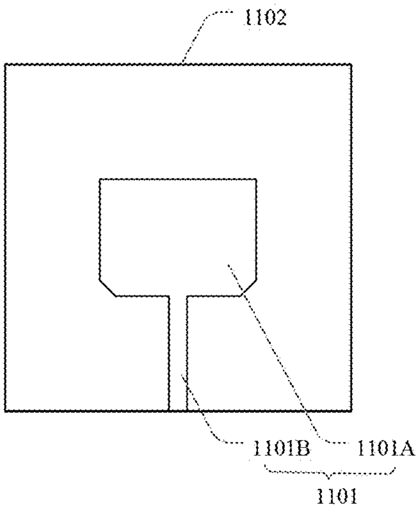

FIGS. 8*a* to 8*e* respectively illustrate plan views of examples of the antenna unit according to embodiments of the present disclosure. As shown in FIG. 8*a*, a first portion 1101A for radiating energy of a first radiating portion 1101 of an antenna unit may be designed to be circular, a second portion 1101B for feeding power to the first portion 1101A may be designed in a strip shape, and a width of the strip is smaller than a diameter of the circle. The second portion 1101B extends from the first portion 1101A to an edge of the display substrate along an extension line of an axis of symmetry of the first portion 1101A, for example, each antenna unit may be arranged as shown in FIG. 1. The first radiating portion 1101 of the antenna unit may also be designed in other shapes. For example, a first portion 1101A of a first radiating portion 1101 may be a hexagon (as shown in FIG. 8*b*), a triangle (as shown in FIG. 8*c*), or a rectangle with four corners cut by a preset arc (as shown in FIG. 8*d*) and a rectangle with two corners cut along a straight line (as shown in FIG. 8*e*), and a second portion 1101B of a first radiating portion 1101 may all be designed in a strip shape (as shown in FIGS. 8*a* to 8*e*).

However, the embodiments of the present disclosure are not limited to thereto, and the first portion 1101A and the second portion 1101B of the first radiating portion 1101 may be designed to have other shapes and sizes as required. In some embodiments, antenna units having the same structure and/or size may be employed among all the plurality of antenna arrays on the display substrate. In other embodiments, antenna units of one antenna array may have a structure and/or size different from that of the antenna units of another antenna array, while antenna units of the same antenna array have the same structure and size.

In addition, although the antenna unit including the first radiating portion 1101 is taken as an example for illustration in the above FIGS. 8*a* to 8*e*, in some embodiments, the second radiating portion may also be provided as described above. The shape of the second radiating portion may be the same as or different from the shape of the first portion 1101A, which is used for radiating energy, of the first radiating portion 1101, but the area of the second radiating portion is smaller than the area of the first part 1101A.

Figure 9:
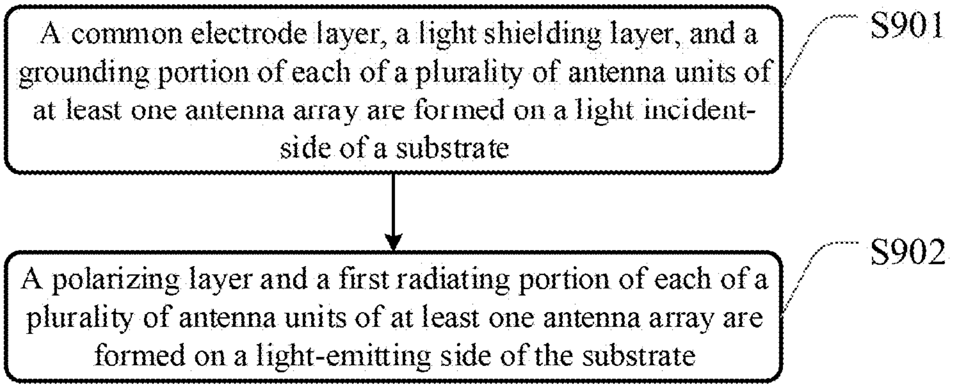
FIG. 9 illustrates a flowchart of a method for manufacturing a display substrate according to an embodiment of the present disclosure.

FIG. 9 illustrates a flowchart of a method for manufacturing a display substrate according to an embodiment of the present disclosure. The method may be applicable to manufacture the display substrate of any of the above-mentioned embodiments.

In step S901, a common electrode layer, a light shielding layer, and a grounding portion of each of a plurality of antenna units of at least one antenna array are formed on a light incident-side of a substrate.

In some embodiments, the grounding portions of the plurality of antenna units of the at least one antenna array, the common electrode layer, and the light shielding layer may be formed on the light-incident side of the substrate in this order, so as to obtain the light incident-side structure of substrate as shown in FIG. 3*a* and FIG. 3*b*. In some embodiments, an insulating layer may also be formed between the common electrode layer and the light shielding layer, so as to obtain the structure on the light-incident side of the substrate as shown in FIG. 3*c*. In some embodiments, the common electrode layer, the light shielding layer, and the grounding portions of the antenna units may be formed on the light-incident side of the substrate in this order, so as to obtain the structure on the light-incident side of the substrate as shown in FIG. 3*e*.

In step S902, a polarizing layer and a first radiating portion of each of a plurality of antenna units of at least one antenna array are formed on a light-emitting side of the substrate.

The first radiating portion may be disposed on a side of the polarizing layer away from the substrate (as shown in FIGS. 3*a* to 3*c*) or a side of the polarizing layer facing the substrate (as shown in FIGS. 3*d* and 3*e*). In some embodiments, a second radiating portion may also be disposed on a side of the first radiating portion away from the substrate, as shown in FIGS. 5*a* and 5*b*.

Figure 10:
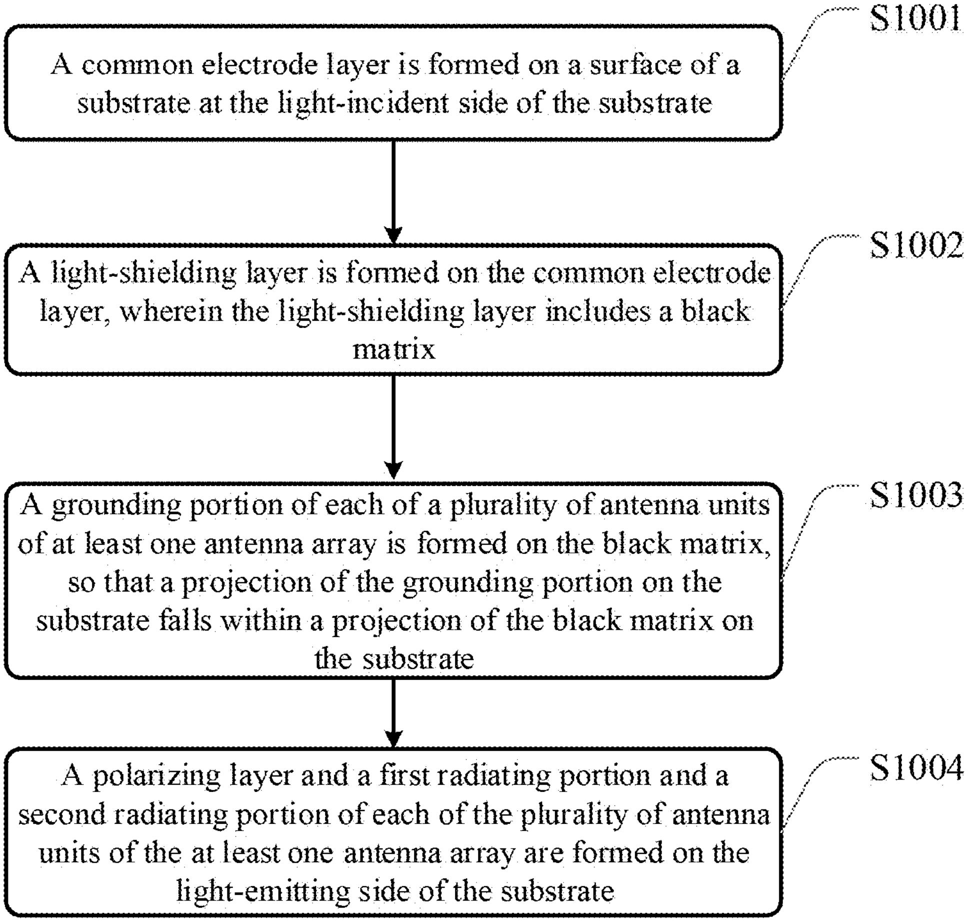
FIG. 10 illustrates a flowchart of the method for manufacturing the display substrate according to another embodiment of the present disclosure.

FIG. 10 illustrates a flowchart of the method for manufacturing the display substrate according to another embodiment of the present disclosure.

In step S1001, a common electrode layer is formed on a surface of a substrate at the light-incident side of the substrate.

In step S1002, a light-shielding layer is formed on the common electrode layer, wherein the light-shielding layer includes a black matrix.

In step S1003, a grounding portion of each of a plurality of antenna units of at least one antenna array is formed on the black matrix, so that a projection of the grounding portion on the substrate falls within a projection of the black matrix on the substrate.

Through the above steps S1001 to S1003, for example, the structure on the light-incident side of the substrate shown in FIGS. 5*a* and 5*b* may be obtained. In some embodiments, the grounding portion may be designed in the form of the metal grid as shown in FIGS. 7*a* and 7*b*, and the width of the grid lines of the metal grid is smaller than a unit width of the black matrix, so that the grounding portion is blocked by the black matrix. The grounding portion, for example, the grounding portion in the form of the metal grid as shown in FIG. 6*a*, may be formed by at least one of magnetron sputtering, thermal evaporation or electroplating.

In step S1004, a polarizing layer and a first radiating portion and a second radiating portion of each of the plurality of antenna units of the at least one antenna array are formed on the light-emitting side of the substrate.

The second radiating portion may be formed on a side of the first radiating portion away from the substrate, so that the projection range of the second radiating portion on the substrate falls within the projection range of the first radiating portion on the substrate. The first radiating portion and the second radiating portion, for example, the first radiating portion and the second radiating portion in the form of the metal grid as shown in FIG. 6*b* and FIG. 6*c*, may be formed by at least one of magnetron sputtering, thermal evaporation or electroplating.

In some embodiments, the first radiating portion may be formed on a surface of the polarizing layer at a side of the polarizing layer (for example, a side facing the substrate), the second radiating portion may be formed on a surface of the polarizing layer at another side of the polarizing layer (for example, a side for away from the substrate), so as to obtain a combined structure including the polarizing layer, the first radiating portion and the second radiating portion. Then, the combined structure is disposed on the light-emitting side of the substrate in a bonding manner, so as to obtain the structure on the light-emitting side of the substrate as shown in FIG. 5*a*.

In some embodiments, the first radiating portion and the second radiating portion may be respectively formed on two sides of the first insulating layer which is made of PET or transparent polyimide, in order to obtain a first combined structure. For example, the first combined structure is attached on a side of the polarizing layer (for example, a side facing the substrate or a side away from the substrate) to obtain a second combined structure. Then, the second combined structure is, for example, attached on the light-emitting side surface of substrate. In this manner, the structure on the light-emitting side of the substrate for example as shown in FIG. 5*b* may be obtained, wherein the first combined structure including the first radiating portion 1101, the second radiating portion 1103 and the insulating layer 70 (first insulating layer) is located a side of the polarizing layer 30 facing the substrate. In some examples, it is also possible to dispose the first combined structure on a side of the polarizing layer away from the substrate.

Figure 11:
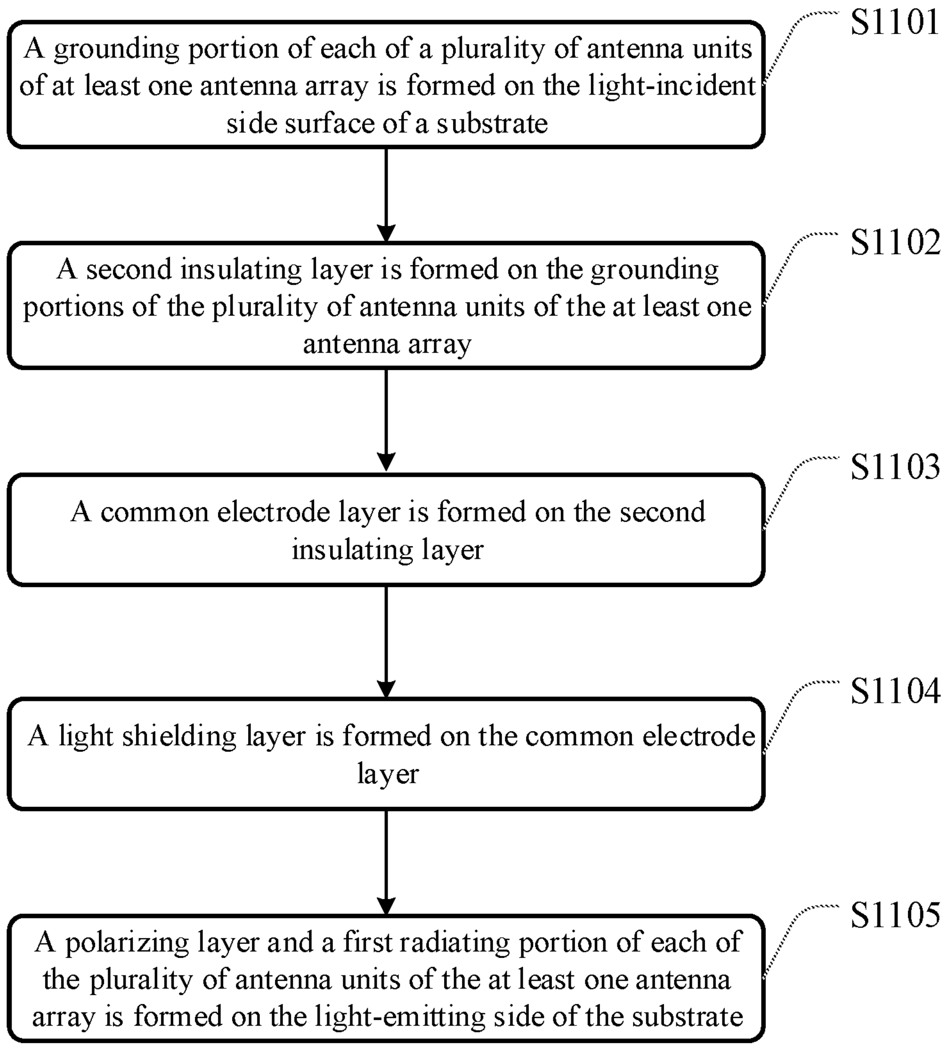
FIG. 11 illustrates a flowchart of the method for manufacturing the display substrate according to yet another embodiment of the present disclosure.

FIG. 11 illustrates a flowchart of the method for manufacturing the display substrate according to another embodiment of the present disclosure.

In step S1101, a grounding portion of each of a plurality of antenna units of at least one antenna array is formed on the light-incident side surface of a substrate.

In step S1102, a second insulating layer is formed on the grounding portions of the plurality of antenna units of the at least one antenna array. For example, the second insulating layer may be formed by Plasma Enhanced Chemical Vapor Deposition (PEVCD).

In step S1103, a common electrode layer is formed on the second insulating layer.

In step S1104, a light shielding layer is formed on the common electrode layer.

Through the above steps S1101 to S1104, for example, the structure on the light incident-side of the substrate as shown in FIG. 3*c* may be formed.

In step S1105, a polarizing layer and a first radiating portion of each of the plurality of antenna units of the at least one antenna array is formed on the light-emitting side of the substrate.

In some embodiments, the first radiating portion may be formed on a surface of the polarizing layer at a side of the polarizing layer (for example, a side facing the substrate), so as to obtain a combined structure including the polarizing layer and the first radiating portion. Then, the combined structure is disposed, for example attached, on the light-emitting side of the substrate, so as to obtain the structure on the light-emitting side of the substrate for example as shown in FIG. 3*d* and FIG. 3*e*. In some embodiments, the first radiating portion may be formed on a surface of the polarizing layer at another side of the polarizing layer (for example, a side away from the substrate), so as to obtain the combined structure including the polarizing layer and the first radiating portion. Then, the combined structure is disposed, for example attached, on the light-emitting side of the substrate, so as to obtain the structure on the light-emitting side of the substrate for example as shown in FIGS. 3*a* to 3*c*.

Hereinafter, the antenna performance of the display substrate of the embodiment of the present disclosure will be described with reference to FIGS. 12*a* to 13*b*.

Figure 12A:
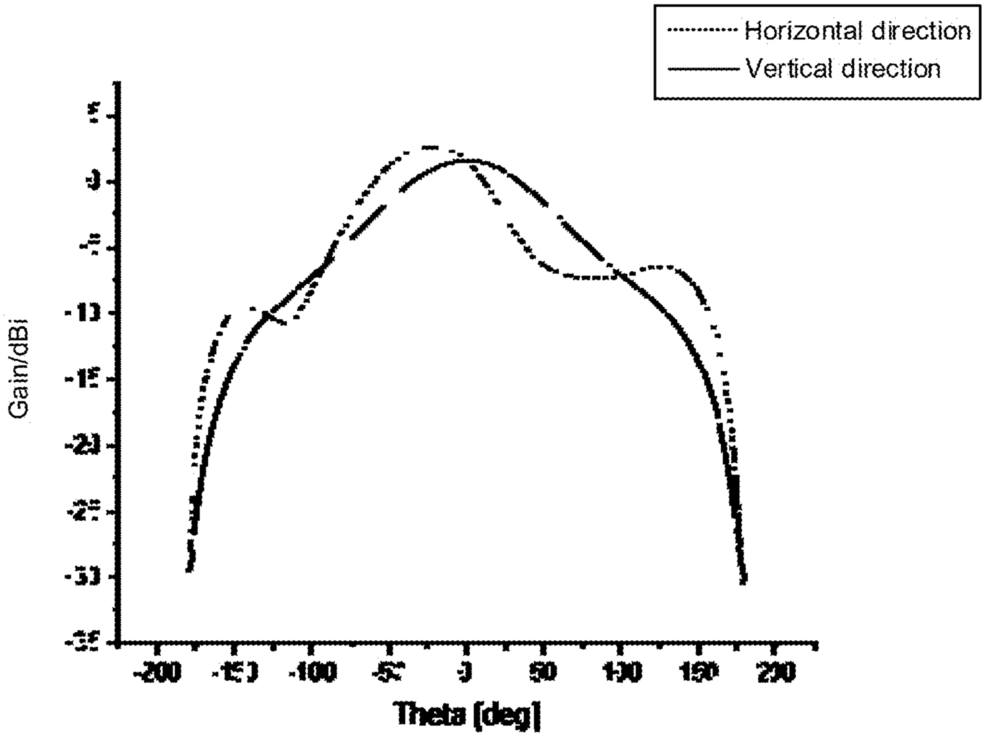
FIG. 12*a* and FIG. 12*b* respectively illustrate an antenna pattern of an antenna array without a second insulating layer and with a second insulating layer according to an embodiment of the present disclosure.
Figure 12B:
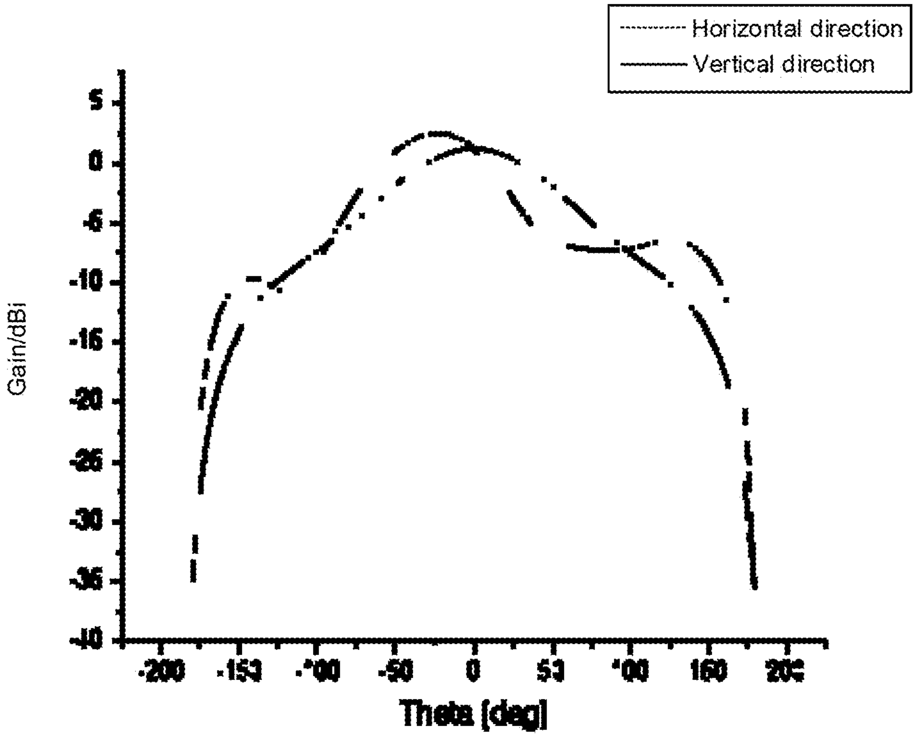
Figure 12C:
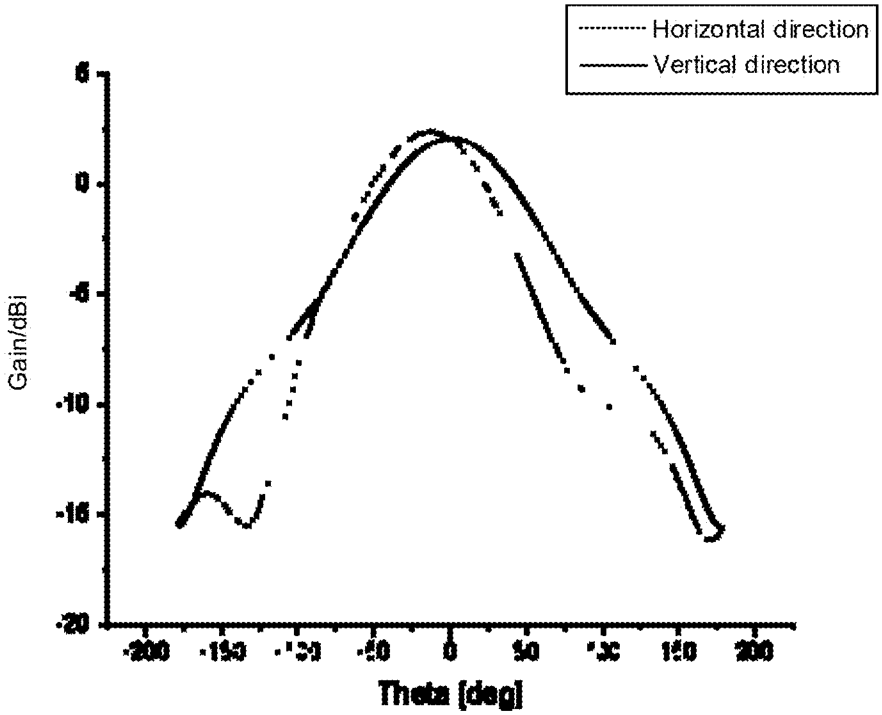
FIG. 12*c* and FIG. 12*d* respectively illustrate an antenna pattern of an antenna array radiating energy in a single frequency band and an antenna pattern of an antenna array radiating energy in a dual frequency band according to an embodiment of the present disclosure.
Figure 12D:
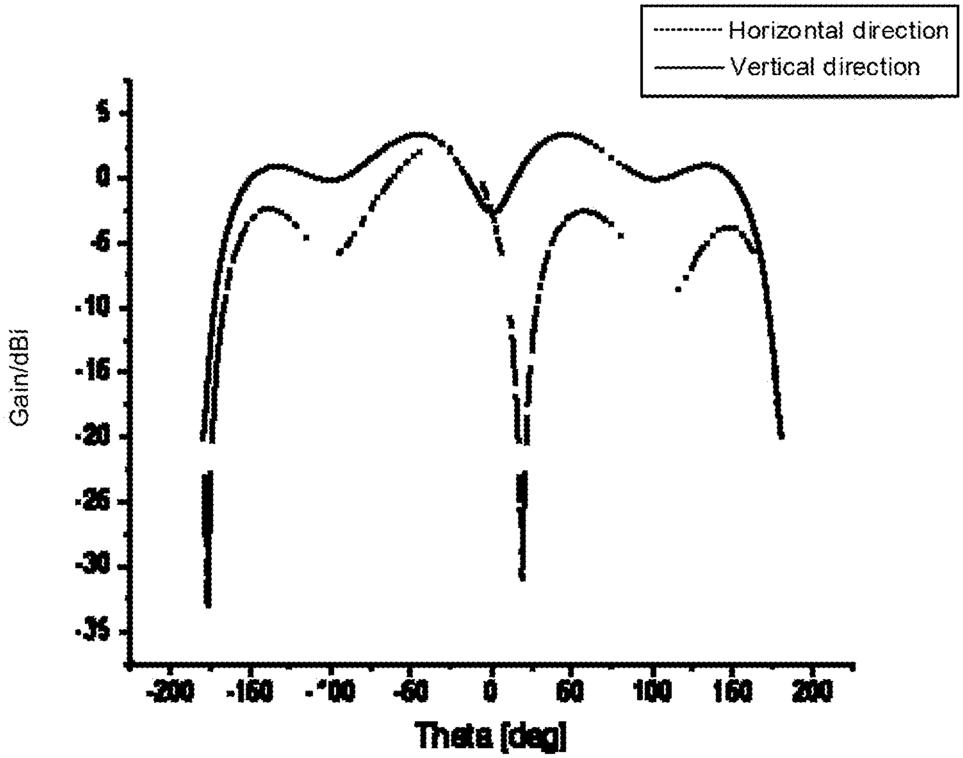

FIGS. 12*a* and 12*b* respectively illustrate an antenna pattern of an antenna array without a second insulating layer and with a second insulating layer (for a case of radiating energy in a single frequency band) according to embodiments of the present disclosure. FIGS. 12*c* and 12*d* respectively show antenna patterns of an antenna array radiating energy in a single frequency band (with a center frequency of about 28 GHz) and an antenna array radiating energy in a dual frequency band (with a center frequency of about 28 GHz and a center frequency of about 39 GHz) according to the embodiments of the present disclosure (for a case where a second insulating layer is included). In FIGS. 12*a* to 12*d*, the abscissa Theta represents angle (in degrees deg), and the ordinate represents gain (in dBi). The dotted line in the figure represents directional pattern curves of two antenna arrays (10C and 10D) arranged in horizontal direction as shown in FIG. 1. The solid line represents directional pattern curves of two antenna arrays (10A and 10B) arranged in vertical direction as shown in FIG. 1.

As seen from FIG. 12*a* and FIG. 12*b*, the antenna array of the embodiments of the present disclosure may achieve desired directivity for both the display substrate with the second insulating layer (As shown in FIG. 3*d*) and the display substrate without the second insulating layer (as shown in FIGS. 3*a* to 3*c*, 3*e*, 4, 5*a* and 5*b*). It may be seen from FIG. 12*c* and FIG. 12*d* that the antenna array of the embodiments of the present disclosure may achieve the desired directivity for both the single-frequency antenna structure (as shown in FIG. 2 to FIG. 3*e*) and the dual-frequency antenna structure (as shown in FIG. 4 to FIG. 5*b*).

Figure 13A:
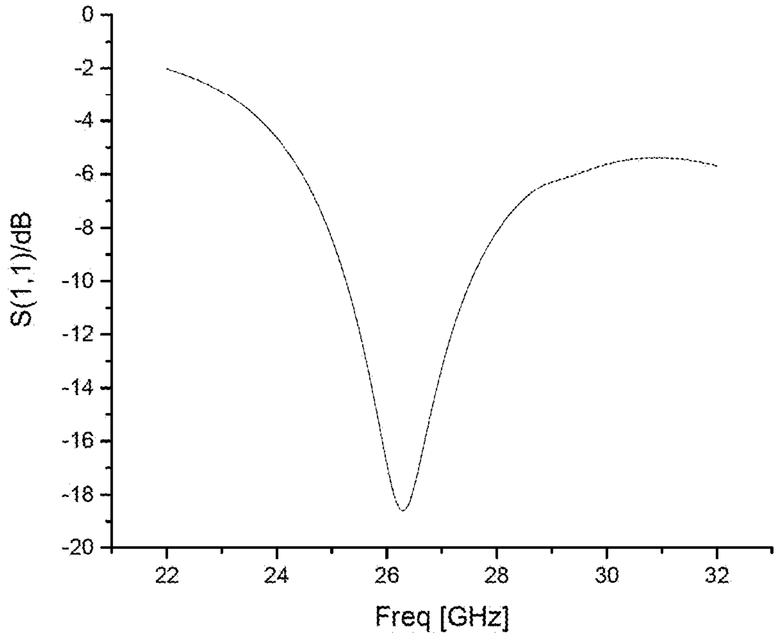
FIGS. 13*a* and 13*b* respectively illustrate graphs of S11 parameter of an antenna port of an antenna array without a second insulating layer and with a second insulating layer according to an embodiment of the present disclosure.
Figure 13B:
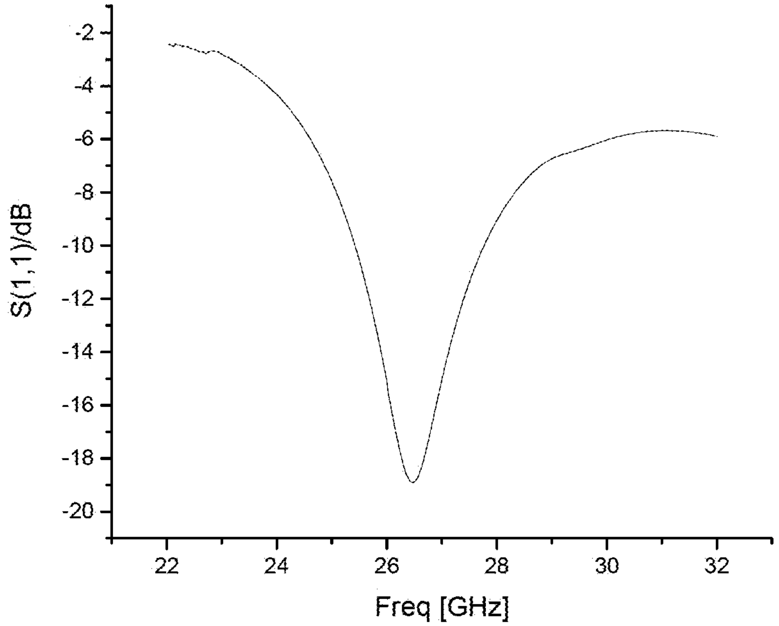
Figure 13C:
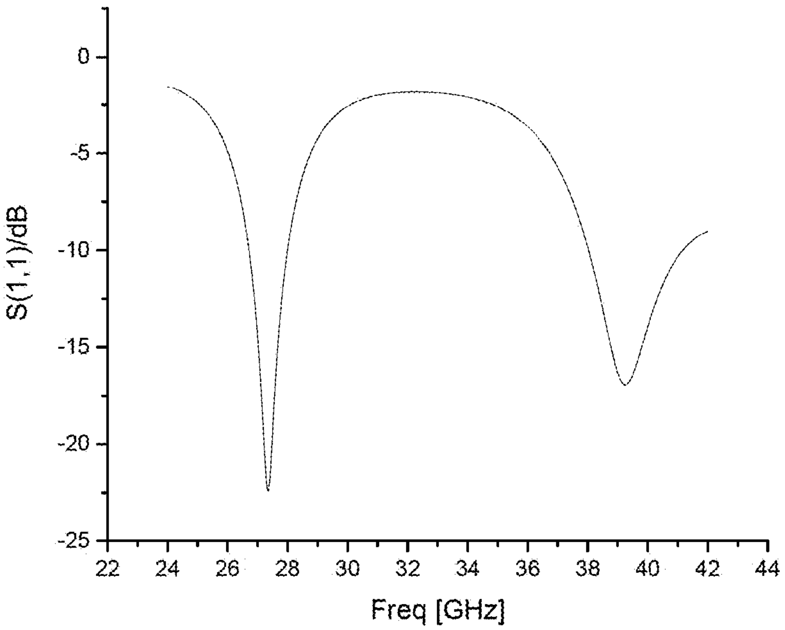
FIG. 13*c* illustrates a graph of S11 parameter of an antenna array radiating energy in a dual frequency band according to an embodiment of the present disclosure.

FIGS. 13*a* and 13*b* respectively illustrate graphs of S11 parameter of an antenna port of an antenna array of the embodiments of the present disclosure without a second insulating layer and with a second insulating layer (for a case of radiating energy in a single frequency band). FIG. 13*c* illustrates a graph of S11 parameter of an antenna array radiating energy in a dual frequency band (with a center frequencies of about 28 GHz and a center frequencies of about 39 GHz) according to the embodiments of the present disclosure (for a case with a second insulating layer). In FIG. 13*a* to FIG. 13*c*, the abscissa Freq represents frequency (in GHz), the ordinate S(1,1) represents value of the S11 parameter (in dB). The S11 parameter, as one of S parameters of antenna, represents a return loss characteristic of antenna. The larger S11 parameter value, the larger a ratio of reflected power of antenna to input power, that is, the larger the return loss. The smaller the S11 parameter value, the lower the return loss of antenna.

As seen from FIG. 13*a* and FIG. 13*b*, the antenna array of the embodiments of the present disclosure may achieve the desired resonance effect with and without the second insulating layer. It may be seen from FIG. 13*c* that the antenna array of the embodiments of the present disclosure may achieve the desired resonance effect in both the first frequency band (with a center frequency of about 28 GHz) and the second frequency band (with a center frequency of about 39 GHz).

Those skilled in the art may understand that the embodiments described above are all exemplary, and those skilled in the art may improve them. The structures described in the various embodiments may be freely combined without any conflict in structure or principle.

After describing the preferred embodiments of the present disclosure in detail, those skilled in the art may clearly understand that various changes and variations may be made without departing from the scope and spirit of the appended claims, and the present disclosure is not limited to the implementation of the exemplary embodiments mentioned in the specification.

What is claimed is:

1. A display substrate, comprising:

a single substrate;

a polarizing layer disposed on a light-emitting side of the single substrate;

a common electrode layer disposed on a light-incident side of the single substrate opposite to the light-emitting side of the single substrate in a direction vertical to the single substrate;

a light shielding layer disposed on a side of the common electrode layer away from the single substrate; and at least one antenna array, wherein each of the at least one antenna array comprises a plurality of antenna units, and each antenna unit of the plurality of antenna units comprises a first radiating portion disposed on the light-emitting side of the single substrate and a grounding portion disposed on the light-incident side of the single substrate;

wherein the light shielding layer comprises a black matrix;

wherein the common electrode layer comprises a common electrode configured to cooperate with electrodes on an array substrate to achieve displaying, wherein each antenna unit of the plurality of antenna units further comprises a second radiating portion disposed on a side of the first radiating portion away from the single substrate, and in each antenna unit of the plurality of antenna units, a projection range of the second radiating portion on the single substrate falls within a projection range of the first radiating portion on the single substrate, wherein an operating frequency of the second radiating portion is greater than an operating frequency of the first radiating portion, and each antenna unit of the plurality of antenna units is configured to transfer energy from the first radiating portion to the second radiating portion through a coupling of the first radiating portion and the second radiating portion, and wherein the grounding portion is disposed on a side of the light shielding layer away from the common electrode layer, a projection range of the grounding portion on the single substrate falls within a projection range of the black matrix on the single substrate, and the grounding portion is implemented as a first grid, the black matrix is implemented as a second grid, the first grid of the grounding portion is laid out in a same manner as the second grid of the black matrix, and wherein the first grid is a metal grid.

2. The display substrate of claim 1, wherein in each antenna unit of the plurality of antenna units, the first radiating portion is disposed on the polarizing layer on a side of the polarizing layer facing the single substrate, and the second radiating portion is disposed on the polarizing layer on a side of the polarizing layer away from the single substrate.

3. The display substrate of claim 1, wherein in each antenna unit of the plurality of antenna units, the first radiating portion and the second radiating portion are disposed on a same side of the polarizing layer, and the display substrate further comprises a first insulating layer disposed between the first radiating portion and the second radiating portion.

4. The display substrate of claim 1, wherein the first radiating portion is disposed on a side of the polarizing layer facing the single substrate or a side of the polarizing layer away from the single substrate.

5. The display substrate of claim 1, wherein the first radiating portion is implemented as a third grid, and the third grid is another metal grid, and wherein a width of grid lines of each of the first grid and the third grid is less than or equal to 5 μm, a distance between adjacent grid lines is greater than or equal to 200 μm.

6. The display substrate of claim 5, wherein each of the first grid and the third grid is made of at least one of copper, gold or silver.

7. The display substrate of claim 1, wherein, the projection range of the first radiating portion on the single substrate falls within the projection range of the grounding portion on the single substrate; and the first radiating portion comprises a first portion for radiating energy and a second portion for feeding power to the first portion for radiating energy, and the second portion extends from the first portion to an edge of the display substrate.

8. The display substrate of claim 1, wherein the at least one antenna array comprises at least one of a first antenna array, a second antenna array, a third antenna array or a fourth antenna array, a plurality of antenna units of the first antenna array are arranged along a first edge of the display substrate, a plurality of antenna units of the second antenna array are arranged along a second edge of the display substrate opposite to the first edge, a plurality of antenna units of the third antenna array are arranged along a third edge of the display substrate, and a plurality of antenna units of the fourth antenna array are arranged along a fourth edge of the display substrate opposite to the third edge.

9. The display substrate of claim 8, wherein each of the first antenna array, the second antenna array, the third antenna array and the fourth antenna array comprises four or more antenna units.

10. A method for manufacturing the display substrate of claim 1, comprising:

forming the common electrode layer, the light shielding layer, and the grounding portion of each of the plurality of antenna units of the at least one antenna array on the light-incident side of the single substrate; and forming the polarizing layer and the first radiating portion of each of the plurality of antenna units of the at least one antenna array on the light-emitting side of the single substrate.

11. The method of claim 10, further comprising: for each of the plurality of antenna units, forming the second radiating portion on the side of the first radiating portion away from the single substrate, so that the projection range of the second radiating portion on the single substrate falls within the projection range of the first radiating portion on the single substrate.

12. The method of claim 11, wherein the first radiating portion and the grounding portion of each of the plurality of antenna units are formed by at least one of magnetron sputtering, thermal evaporation or electroplating.

13. The method of claim 10, wherein the forming the common electrode layer, the light shielding layer and the grounding portion of each of the plurality of antenna units of the at least one antenna array on the light-incident side of the single substrate comprises:

forming the common electrode layer on a surface of the single substrate at the light-incident side of the single substrate;

forming the light-shielding layer on the common electrode layer;

forming the grounding portion of each of the plurality of antenna units of the at least one antenna array on the black matrix, so that the projection range of the grounding portion on the single substrate falls within the projection range of the black matrix on the single substrate.

* * * * *